US008229156B1

(12) United States Patent
Yagnik

(10) Patent No.: US 8,229,156 B1
(45) Date of Patent: Jul. 24, 2012

(54) USING CURVE INVARIANTS TO AUTOMATICALLY CHARACTERIZE VIDEOS

(75) Inventor: Jay N. Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1168 days.

(21) Appl. No.: 11/500,676

(22) Filed: Aug. 8, 2006

(51) Int. Cl.
*G06K 9/00* (2006.01)

(52) U.S. Cl. .......................... 382/100; 348/571; 386/46

(58) Field of Classification Search .................. None
See application file for complete search history.

(56) References Cited

U.S. PATENT DOCUMENTS

| 6,535,639 | B1 | 3/2003 | Uchihachi et al. | |
|---|---|---|---|---|
| 2001/0025375 | A1 | 9/2001 | Ahmad et al. | |
| 2004/0170321 | A1 | 9/2004 | Gong et al. | |
| 2005/0234952 | A1 | 10/2005 | Zeng et al. | |
| 2006/0253491 | A1* | 11/2006 | Gokturk et al. | 707/104.1 |
| 2007/0025615 | A1 | 2/2007 | Zhou et al. | |

FOREIGN PATENT DOCUMENTS

WO   WO 2004/040480 A1   5/2004

OTHER PUBLICATIONS

Lades, Martin; Vorbruggen, Jan C.; Buhmann, Joachim; Lange, Jorg; Malsburg, Christoph; Wurtz, Rolf P.; Konen, Wolfgang. "Distortion Invariant Object Recognition in the Dynamic Link Architecture". 1993. IEEE. vol. 42, Issue 3, pp. 300-311.*

"Shot Boundary Detection Via Similarity Analysis", by Matthew Cooper et al., Proc. of TREC Video Retrieval Evaluation (TRECVID) 2003, http://www.fxpal.com.*
"Automatic Classification of Protein Structure by Using Gauss Integrals", by Peter Rogen et al., Proceedings of the National Academy of Sciences, Jan. 7, 2003, vol. 100, No. 1, pp. 119-124.*
"Integral Geometry of Plane Curves and Knot invariants", by X.S. Lin et al., Journal of Differential Geometry, 44 (1996), pp. 74-95.
"Principal components analysis", [online], [retrieved on Sep. 1, 2006], retrieved from http://en.wikipedia.org/wiki/Karhunen-Lo%C3%A8ve_transform.
"Vassiliev Invariant", [online], by Eric Weisstein, Wolfram Research, [retrieved on Sep. 1, 2006], retrieved from http://mathworld.wolfram.com/VassilievInvariant.html.
"On the Vassiliev Knot Invariants", by Dror Bar-natan, Topology 34, 423-472, 1995.
"Fast and Robust Short Video Clip Search Using an Index Structure", by Junson Yuan et al., proceedings of the6th ACM SIGMM International Workshop on Multimedia Information Retrieval, New York, NY, USA, pp. 61-68.

(Continued)

*Primary Examiner* — Samir Ahmed
*Assistant Examiner* — Fred Hu
(74) *Attorney, Agent, or Firm* — Fenwick & West LLP

(57) ABSTRACT

One embodiment of the present invention provides a computer-based system that automatically characterizes a video. During operation, the system extracts feature vectors from sampled frames in the video. Next, the system uses the extracted feature vectors for successive sampled frames in the video to define a curve. The system then determines a set of invariants for the curve. Next, the system using the set of invariants to characterize the video. The system can then use the characterization of the video to perform various operations, such as classifying the video with respect to other videos or detecting duplicates of the video.

24 Claims, 2 Drawing Sheets

OTHER PUBLICATIONS

"Fast and Robust Short Video Clip Search Using an Index Structure" by Ling-Yu Duan et al., Proceedings of the 12th annual ACM International conference on Multimedia 2004: 756-757, ISBN: 1-58112-893-8.

"Summarizing Video using Non-Negative Similarity Matrix Factorization" by Matthew Cooper et al., Proc. IEEE Workshop on Multimedia Signal Processing, 2002, www.fxpal.com/FXPAL-PR-02-1888.pdf.

Shot Boundary Detection Via Similarity Analysis, by Matthew Cooper et al., Proc. of TREC Video Retrieval Evaluation (TRECVID) 2003, http://www.fxpal.com.

Aner-Wolf, A., et al., "Video Summaries and Cross-Referencing Through Mosaic-Based Representation," Computer Vision and Image Understanding, 2004, pp. 201-237, vol. 95, Elsevier, Inc.

Cooper, M., et al., "Scene Boundary Detection via Video Self-Similarity Analysis," IEEE 2001, pp. 378-381.

Cox, T., et al., "Multidimensional Scaling," 2nd Ed., Chapman & Hall/CRC, 2001, pp. 31-131.

Kender, J.R., et al., "Video Scene Segmentation Via Continuous Video Coherence," NIST 1997, 7 Pages.

Lee, T. S., "Image Representation Using 2D Gabor Wavelets," IEEE Transactions on Pattern Analysis and Machine Intelligence, Oct. 1996, pp. 959-971, vol. 1996, vol. 18. No. 10.

Lu, S., et al., "A Novel Video Summarization Framework for Document Preparation and Archival Applications," IEEEAC paper#1415, IEEE, 2005, pp. 1-10.

PCT International Search Report and Written Opinion mailed Feb. 18, 2008, PCT/US2007/008951, 14 Pages.

Permuter, H., et al., "A Study of Gaussian Mixture Models of Colour and Texture Features for Image Classification and Segmentation," Pattern Recognition, 2006, pp. 695-706, vol. 39.

Reininger, R. C. et al., "Distributions of the Two Dimensional DCT Coefficients for Images," IEEE Transactions on Communications, Jun. 1983, pp. 835-839, vol. COM-31, No. 6.

Santiago-Mozos, R., et al., "Supervised-PCA and SVM Classifiers for Object Detection in Infrared Images," IEEE Conference on Advanced Video and Signal Based Surveillance, 2003, 6 Pages.

Schmid, C., et al., "Pattern Recognition with Local Invariant Features," Handbook of Pattern Recognition and Computer Vision, Chapter 1.5, 3rd edition, C. H. Chen and P. S. P Wang editors, World Scientific 5 Publishing Co., 2005, pp. 71-92.

Skalak, D. B., "Prototype Selection for Composite Nearest Neighbor Classifiers," Ph.D. thesis, Department of Computer Science, University of Massachusetts, May 1997, ProQuest Dissertations and Theses, 282 Pages.

Uchihashi, S., et al., "Video Manga: Generating Semantically Meaningful Video Summaries," ACM Multimedia '99, Oct. 1999, pp. 383-392, Orlando, FL.

Zeeshan, R., et al., "Scene Detection in Hollywood Movies and TV Shows," IEEE Computer Society Conference on Computer Vision and Pattern Recognition, 2003, pp. 1-8.

Zhu. X., et al., "Hierarchical Video Content Description and Summarization Using Unified Semantic and Visual Similarity," Multimedia Systems, 2003, pp. 31-53, vol. 9.

* cited by examiner

USING CURVE INVARIANTS TO AUTOMATICALLY CHARACTERIZE VIDEOS

RELATED APPLICATION

The subject matter of this application is related to the subject matter in a co-pending non-provisional application by the same inventor as the instant application entitled, "Method and Apparatus for Automatically Summarizing Video," having Ser. No. 11/454,386, and filing date 15 Jun. 2006.

BACKGROUND

1. Field of the Invention

The present invention relates computer-based techniques for manipulating video data. More specifically, the present invention relates to a computer-based technique for automatically characterizing a video using "curve invariants," wherein the curve invariants are associated with a curve defined by features for successive sampled frames in the video.

2. Related Art

The recent proliferation of high-bandwidth Internet connections and associated developments in content-distribution technologies presently make it possible for millions of users to efficiently access video content on the Internet. These developments have led to a tremendous increase in the amount of video content that is being downloaded from the Internet. Internet users routinely view video clips from numerous web sites and portals to obtain various types of information and entertainment. At the same time, a number of video-sharing web sites have been recently launched, which are dedicated to sharing and distributing video clips. Some of these video-sharing web sites are being accessed by millions users each day.

In order to access large numbers of video clips, it is advantageous for the users to be able to characterize the video clips to facilitate classifying the video clips (for example by genre) or to detect duplicate video clips (which is useful for detecting copyright violations). Unfortunately, no mechanisms are presently available to automatically characterize and classify videos. Hence, users must manually characterize and classify videos, which is an extremely labor-intensive proposition for the millions of video clips which are accessible through the Internet.

Hence, what is needed is a method and an apparatus for automatically characterizing a video without the above-described problems.

SUMMARY

One embodiment of the present invention provides a computer-based system that automatically characterizes a video. During operation, the system extracts feature vectors from sampled frames in the video. Next, the system uses the extracted feature vectors for successive sampled frames in the video to define a curve. The system then determines a set of invariants for the curve. Next, the system using the set of invariants to characterize the video. The system can then use the characterization of the video to perform various operations, such as classifying the video with respect to other videos or detecting duplicates of the video.

In a variation on this embodiment, extracting a feature vector for a sampled frame in the video involves producing a color histogram for the sampled frame.

In a variation on this embodiment, prior to using the feature vectors to define a curve, the system maps the feature vectors from a higher-dimensional space to a lower-dimensional space. This mapping can involve using a multi-dimensional scaling (MDS) technique, or a principal component analysis (PCA) technique.

In a variation on this embodiment, the invariants for the curve include knot invariants.

In a further variation, the knot invariants include Vassiliev invariants.

In a further variation, the curve is a closed curve. In this variation, determining the set of invariants involves using a Gauss integral formulation of Vassiliev knot invariants to calculate a writhe of the closed curve.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

Characterizing a Video

Figure 1:
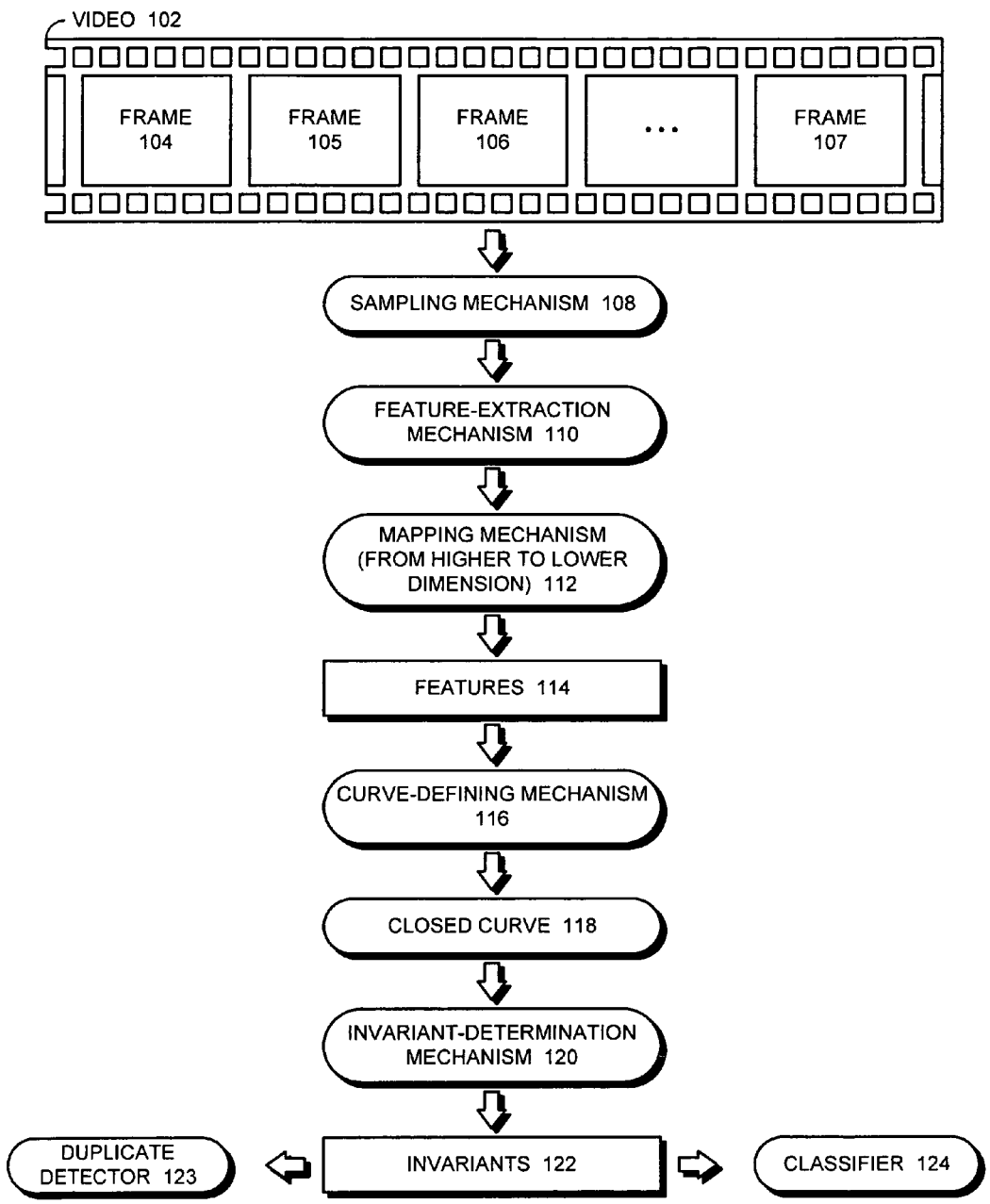
FIG. 1 presents a flow diagram illustrating the process of characterizing a video in accordance with an embodiment of the present invention.

FIG. 1 presents a flow diagram illustrating the process of characterizing a video in accordance with an embodiment of the present invention. This system starts by receiving the video 102, which is comprised of a number of image frames.

Next, a sampling mechanism 108 samples frames from video 102. For example, sampling mechanism 108 may sample every $30^{th}$ frame.

These sampled frames feed into feature-extraction mechanism 110, which extracts a "feature" for each sampled frame. For example, in one embodiment of the present invention, feature-extraction mechanism 110 partitions a frame into a 4×6 array of tiles and the system extracts color histogram features for each of these tiles. The histogram provides 8 bits for each color, making the total feature vector length 4×6×8× 8×8=12288. (Note that the terms "feature" and "feature vector" are used interchangeably throughout this specification.)

Although this disclosure describes an implementation which uses features associated with tiles, the present invention is not limited to using features associated with tiles. In general, the present invention can be used with any type of image feature. For example, the present invention can be used with DCT coefficients for images. (For more information in DCT coefficients for images, please see, R. C. Reininger and J. D. Gibson, "Distributions of the Two-Dimensional DCT Coefficients for Images," *IEEE Transactions on Communications COM*-31, 6 (1983), pp. 835-839, which is hereby incorporated by reference.) In another example, image features can be Gabor Wavelets. (For more information on Gabor Wavelets for images, please see, T. S. Lee, "Image Representation Using 2D Gabor Wavelets," *IEEE Transactions on Pattern Analysis and Machine Intelligence*, vol. 18. no. 10, pp. 959-971, 1996, which is hereby incorporated by reference.) In yet another example, image features can be local features defined in terms of points-of-interest and associated descriptors. (For more information these types of local features, please see C. Schmid, G. Dorko, S. Lazebnik, K. Mikolajczyk, and J. Ponce, "Pattern Recognition with Local Invariant Features," *Handbook of Pattern Recognition and Computer Vision, 3rd edition*, C. H. Chen and P. S. P Wang editors, World Scientific Publishing Co., 2005, which is hereby incorporated by reference.)

Next, a mapping mechanism 112 maps the features from a higher-dimensional space to a lower dimensional space to produce a set of dimension-reduced features. For example, in one embodiment of the present invention, the system maps the color histogram feature vectors described above into feature vectors in a three-dimensional space. As mentioned above, this mapping can involve using a number of different techniques, such as the multi-dimensional scaling (MDS) technique, or the principal component analysis (PCA) technique. For a further description of the MDS technique, please see T. Cox and M. Cox, "Multidimensional Scaling," $2^{nd}$ Ed., Chapman & Hall/CRC, 2001, which is hereby incorporated by reference. For a further description of the PCA technique, please see the Wikipedia entry for "PCA technique" retrieved from the Wikipedia web site on 7 Aug. 2006, which is hereby incorporated by reference.

Next, a curve-defining mechanism 116 uses the features for successive sampled frames in the video to define a closed curve 118. This can involve linking the features for successive sampled frames, either using line segments or interpolated curves. Next, the system closes the curve by linking the feature for the last sampled frame to the feature for the first sampled frame. At this point, the video is effectively modeled as a closed curve which evolves over time through a multi-dimensional space.

Then system then uses an invariant-determining mechanism 120 to determine a set of invariants 122 for the closed curve. One embodiment of the present invention uses a Gauss integral formulation of Vassiliev knot invariants to calculate a "writhe" of the closed curve. For example, see P. Røgen and B. Fain, "Automatic Classification of Protein Structure by Using Gauss Integrals," *Proceedings of the National Academy of Sciences*, 7 Jan. 2003, vol. 100, No. 1, pp. 119-124 (hereinafter referred to as "Røgen"), which is hereby incorporated by reference.

A "writhe" as "a property of a 2-dimensional representation of a knot or link." More specifically, the writhe of a knot or line "is the total number of positive crossings minus the total number of negative crossings. Crossings are classed as positive or negative by assigning an orientation to the knot. That is, a direction is assigned to the knot at a point and this direction is followed all the way around the knot. If as you travel along the knot and cross over a crossing, the strand underneath goes from right to left, the crossing is positive; if the lower strand goes from left to right, the crossing is negative" (see the definition of "writhe" in Wikipedia).

One embodiment of the present invention calculates the writhe of the closed curve using the technique described in Røgen. More specifically, Appendix A of Røgen states that "the writhe, Wr, of a space curve, $\gamma$, may be calculated by using the Gauss integral $$Wr(\gamma) = \frac{1}{4\pi} \int_{\gamma \times \gamma \setminus D} \int \omega(T_1, t_2) \, dt_1 dt_2$$

where $w(t_1, t_2) = [\gamma'(t_1), \gamma(t_1) - \gamma(t_2), \gamma'(t_2)] | \gamma(t_1) - \gamma(t_2) |^3$, where D is the diagonal of $\gamma \times \gamma$, and $[\gamma'(t_1), \gamma(t_1) - \gamma(t_2), \gamma'(t_2)]$ is the triple scalar product. As $\omega(t_1, t_2) = \omega(t_2, t_1)$, the writhe may be calculated as an integral over a 2-simplex, namely $$I_{(1,2)}(\gamma) = Wr(\gamma) = \frac{1}{2\pi} \int_{0 < t_1 < t_2 < L} \int \omega(t_1, t_2) \, dt_1 dt_2.$$

For a polygonal curve $\mu$ the natural definition of writhe is, $$I_{(1,2)}(\mu) = Wr(\mu) = \sum_{0 < i_1 < i_2 < N} W(i_1, i_2),$$

with $$W(i_1, i_2) = \frac{1}{2\pi} \int_{i_1 = t_1}^{i_1 + 1} \int_{i_2 = t_2}^{i_2 + 1} w(t_1, t_2) \, dt_1 dt_2$$

where $W(i_1, i_2)$ is the contribution to writhe coming from the $i_1$th and the $i_2$th line segments, which equals the probability from an arbitrary direction to see the $i_1$th and the $i_2$th line segment cross, multiplied by the sign of this crossing. Therefore, geometrically writhe is still the signed average number of crossings averaged over the observer's position located in all space directions. The unsigned average number of crossings seen from all directions, known as the average crossing number, is $$I_{|1,2|}(\mu) = \sum_{0 < i_1 < i_2 < N} |W(i_1, i_2)|. \quad (A)$$

A whole family of structural measures containing, e.g., $$I_{|1,3|(2,4)}(\mu) = \sum_{0 < i_1 < i_2 < i_3 < i_4 N} |W(i_1 i_3)| |W(i_2, i_4)| \quad (B)$$

and $$I_{(1,5)(2,4)(3,6)}(\mu) = \sum_{0 < i_1 < i_2 < i_3 < i_4 < i_5 < i_6 < N} W(i_1, i_5) W(i_2, i_4) W(i_3, i_6) \quad (C)$$

may be constructed by using writhe and average crossing number as the basic building blocks." These measures are inspired by integral formulas for the Vassiliev knot invariants (see X. S. Lin and Z. Wang, "Integral Geometry of Plane Curves and Knot invariants," *Journal of Differential Geometry*, 44 (1996), pp. 74-95). The invariants from the above equations form a natural progression of descriptors of curves, much as moments of inertia and their correlations describe solids. Furthermore, note that there is a notion of "order" to these descriptors. For example, the above equations (A), (B) and (C) are first, second and third order descriptors, respectively. Such descriptors can be used to form the set of invariants 122.

After the set of invariants 122 is determined, the set of invariants 122 can be used to perform a number of different operations. For example, a duplicate detector 123 can attempt to match the set of invariants with similarly computed invariants for other videos in an attempt to detect duplicate video, which can be useful for detecting copyright violations.

In another example, the set of invariants 122 can be fed into a classifier 124, which can be used to classify the video with respect to other videos. Note that there exist a large number of well-known classification techniques and any one of these classification techniques may be used to classify video 102.

In one embodiment of the present invention, classifier 124 classifies videos into different "genres." This classification into genres can be accomplished using any one of a number of well-known classification techniques. For example, a nearest-neighbor classification technique can be used to cluster videos into genres. (For more details on nearest-neighbor classifiers, please see D. B. Skalak, "Prototype Selection for Composite Nearest Neighbor Classifiers," Ph.D. thesis, Department of Computer Science, University of Massachusetts, 1996, which is hereby incorporated by reference.) In another example, support-vector machine (SVM) classifiers can be used to classify videos into genres. (For more details on SVM classifiers, please see R. Santiago-Mozos, J. M. Leiva-Murillo, F. Perez-Cruz, and A. Artes-Rodriguez, "Supervised-PCA and SVM Classifiers for Object Detection in Infrared Images," *IEEE Conference on Advanced Video and Signal Based Surveillance*, which is hereby incorporated by reference.) In yet another example, a Gaussian-Mixture model can be used the classify videos into genres. (For more details on using a Gaussian-Mixture model, please see H. Permuter, J. M. Francos and I. H. Jermyn, "A Study of Gaussian Mixture Models of Colour and Texture Features for Image Classification and Segmentation," *Pattern Recognition*, 2005, which is hereby incorporated by reference.)

System

Figure 2:
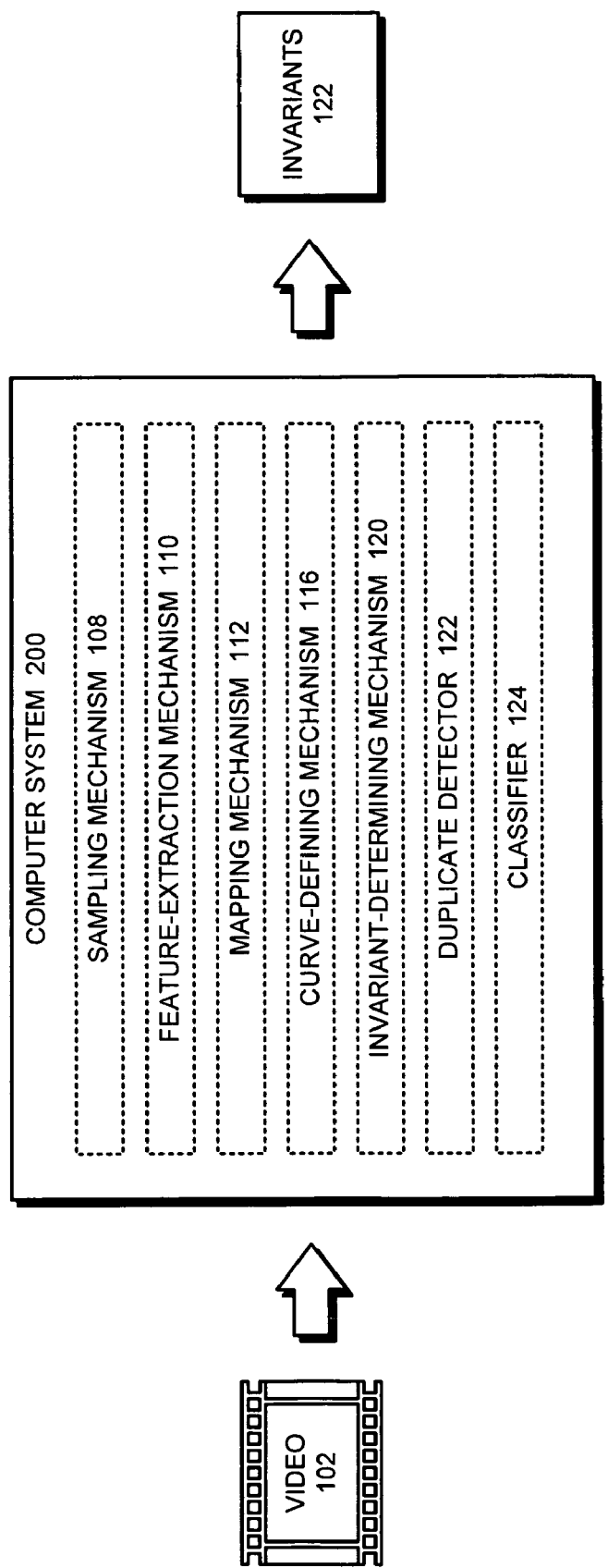
FIG. 2 illustrates a system for characterizing a video in accordance with an embodiment of the present invention.

FIG. 2 illustrates a computer-based system for characterizing a video in accordance with an embodiment of the present invention. This computer-based system operates within a computer system 200, which can generally include any type of computer system, including, but not limited to, a computer system based on a microprocessor, a mainframe computer, a digital signal processor, a portable computing device, a personal organizer, a device controller, and a computational engine within an appliance.

As is illustrated in FIG. 2, computer system 200 includes a number of software modules that implement: sampling mechanism 108, feature-extraction mechanism 110, mapping mechanism 112, curve-defining mechanism 116, invariant-determining mechanism 120, duplicate detector 123 and classifier 124. These mechanisms operate collectively to produce a signature, which comprises the set of invariants 122 of the curve which is defined by successive sampled frames in video 102.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-based method for automatically characterizing a video, comprising:
using a computer system to:
receive the video, the video comprising a set of frames;
extract a set of feature vectors from a set of successive sampled frames within the set of frames, wherein each of the set of feature vectors corresponds to a successive frame in the successive sampled frames, including a first successive frame and a last successive frame;
link the feature vectors between pairs of successive frames, including linking the feature vector of the last successive frame to the feature vector of the first successive frame, the linked feature vectors defining a closed curve;
determine a set of invariants for the closed curve; and
use the set of invariants to characterize the video.

2. The method of claim 1, wherein extracting a feature vector for a sampled frame in the video involves producing a color histogram for the sampled frame.

3. The method of claim 1, wherein using the set of invariants to characterize the video involves classifying the video with respect to other videos based on the set of invariants.

4. The method of claim 1, wherein using the set of invariants to characterize the video involves detecting duplicates of the video based on set of invariants.

5. The method of claim 1, wherein the method further comprises mapping the feature vectors from a higher-dimensional space to a lower-dimensional space prior to linking the feature vectors.

6. The method of claim 5, wherein mapping the feature vectors from the higher-dimensional space to the lower-dimensional space involves using:
a multi-dimensional scaling (MDS) technique; or
a principal component analysis (PCA) technique.

7. The method of claim 1, wherein the invariants for the curve include knot invariants.

8. The method of claim 7, wherein the knot invariants include Vassiliev invariants.

9. The method of claim 8, wherein determining the set of invariants involves using a Gauss integral formulation of Vassiliev knot invariants to calculate a writhe of the closed curve.

10. A non-transitory computer-readable storage medium storing instructions that when executed by a computer cause the computer to perform a method for automatically characterizing a video, the method comprising:
receiving the video at a computer system, wherein the video comprises a set of frames;
extracting a set of feature vectors from a set of successive sampled frames within the set of frames, wherein each of the set of feature vectors corresponds to a successive frame in the set of successive sampled frames, including a first successive frame and a last successive frame;
link the feature vectors between pairs of successive frames, including linking the feature vector of the last successive frame to the feature vector of the first successive frame, the linked feature vectors defining a closed curve;
determining a set of invariants for the closed curve; and
using the set of invariants to characterize the video.

11. The computer-readable storage medium of claim 10, wherein extracting a feature vector for a sampled frame in the video involves producing a color histogram for the sampled frame.

12. The computer-readable storage medium of claim 10, wherein using the set of invariants to characterize the video involves classifying the video with respect to other videos based on the set of invariants.

13. The computer-readable storage medium of claim 10, wherein using the set of invariants to characterize the video involves detecting duplicates of the video based on set of invariants.

14. The computer-readable storage medium of claim 10, wherein the method further comprises mapping the feature vectors from a higher-dimensional space to a lower-dimensional space prior to linking the feature vectors.

15. The computer-readable storage medium of claim 14, wherein mapping the feature vectors from the higher-dimensional space to the lower-dimensional space involves using:
   a multi-dimensional scaling (MDS) technique; or
   a principal component analysis (PCA) technique.

16. The computer-readable storage medium of claim 10, wherein the invariants for the curve include knot invariants.

17. The computer-readable storage medium of claim 16, wherein the knot invariants include Vassiliev invariants.

18. The computer-readable storage medium of claim 17, wherein determining the set of invariants involves using a Gauss integral formulation of Vassiliev knot invariants to calculate a writhe of the closed curve.

19. An apparatus for automatically characterizing a video, comprising:
   a receiving mechanism configured to receive the video, wherein the video comprises a set of frames;
   a feature-extraction mechanism configured to extract a set of feature vectors from a set of successive sampled frames within the set of frames, wherein each of the set of feature vectors corresponds to a successive frame in the set of successive sampled frames, including a first successive frame and a last successive frame;
   a curve-defining mechanism configured to link the feature vectors between pairs of successive frames, including linking the feature vector of the last successive frame to the feature vector of the first successive frame, the linked feature vectors defining a closed curve; and
   a characterization mechanism configured to:
      determine set of invariants for the closed curve; and to
      use the set of invariants to characterize the video.

20. The apparatus of claim 19, wherein while extracting a feature vector for a sampled frame in the video, the feature-extraction mechanism is configured to produce a color histogram for the sampled frame.

21. The apparatus of claim 19, wherein while using the set of invariants to characterize the video, the characterization mechanism is configured to classify the video with respect to other videos based on the set of invariants.

22. The apparatus of claim 19, wherein while using the set of invariants to characterize the video, the characterization mechanism is configured to detect duplicates of the video based on set of invariants.

23. The apparatus of claim 19, wherein the feature-extraction mechanism is configured to map the feature vectors from a higher-dimensional space to a lower-dimensional space prior to linking the feature vectors.

24. The apparatus of claim 19, wherein the invariants for the curve include knot invariants.

* * * * *